E. K. BAKER.
AUTOMOBILE WHEEL.
APPLICATION FILED AUG. 14, 1916.
1,314,937.
Patented Sept. 2, 1919.
2 SHEETS—SHEET 2.
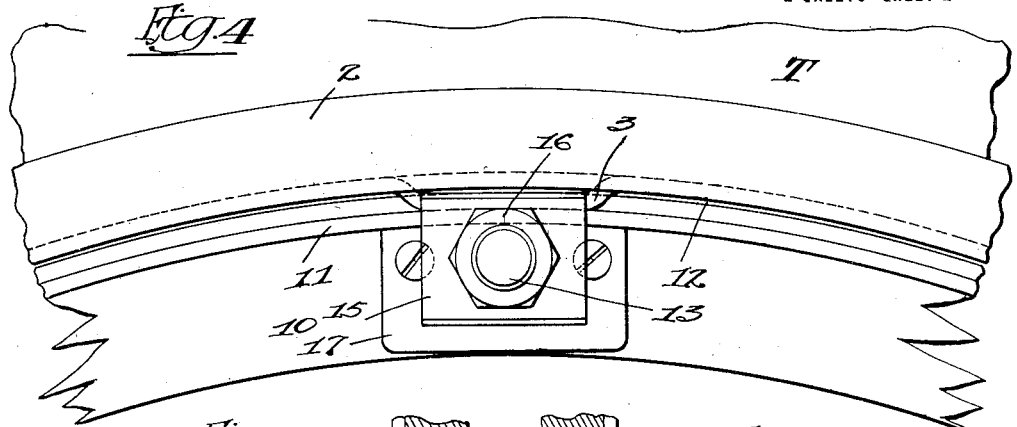
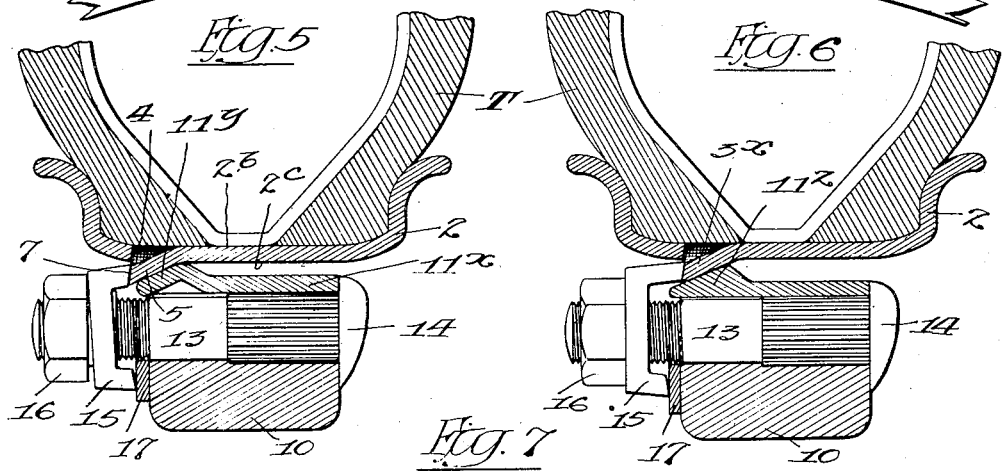
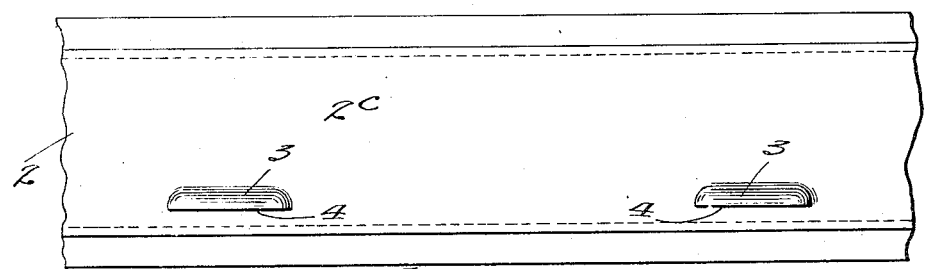
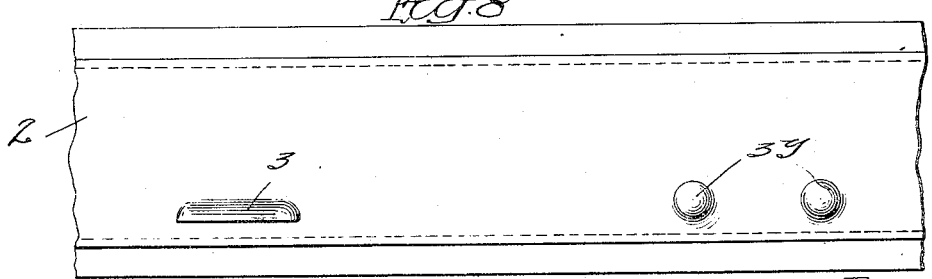

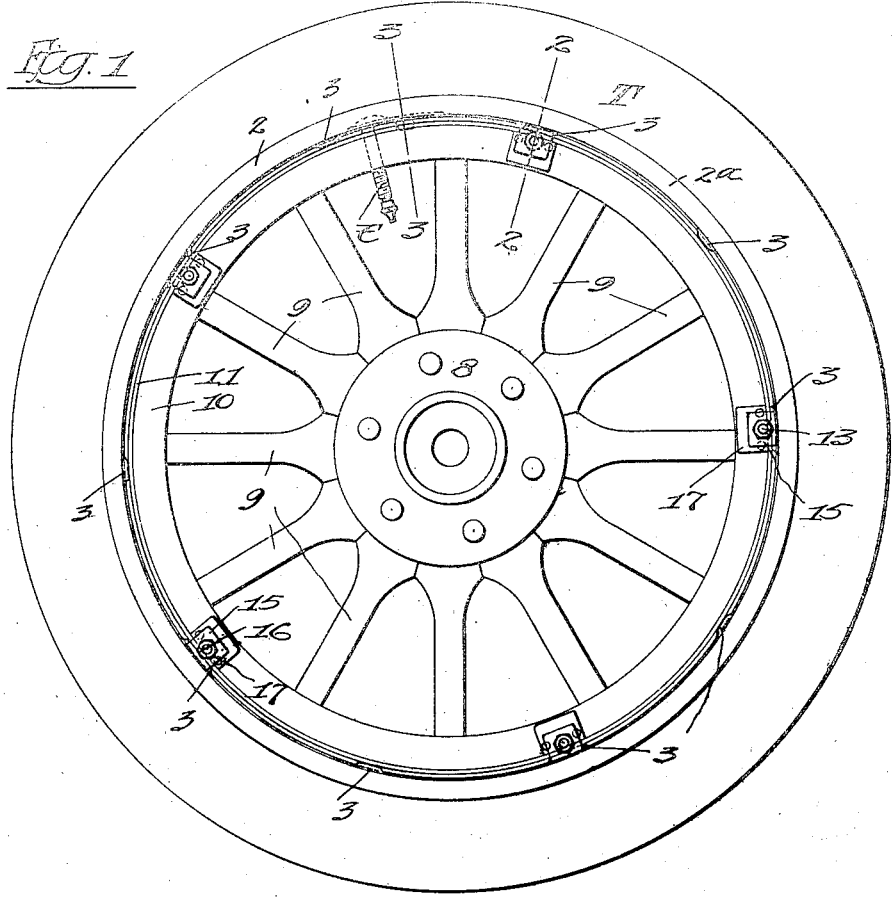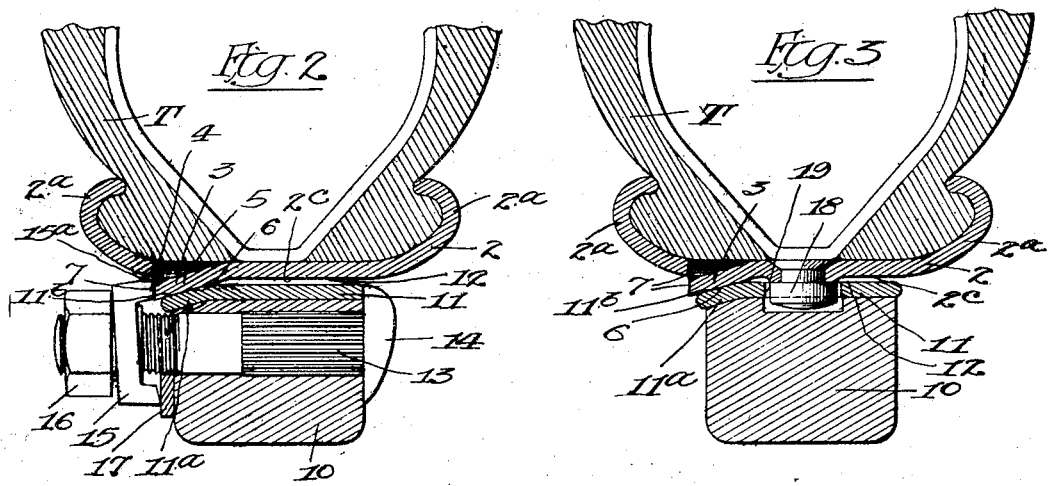

UNITED STATES PATENT OFFICE.

ERLE KING BAKER, OF CHICAGO, ILLINOIS, ASSIGNOR TO UNIVERSAL RIM COMPANY, OF CHICAGO, ILLINOIS, A CORPORATION OF ILLINOIS.

AUTOMOBILE-WHEEL.

1,314,937.  Specification of Letters Patent.  Patented Sept. 2, 1919.

Application filed August 14, 1916. Serial No. 114,802.

*To all whom it may concern:*

Be it known that I, ERLE KING BAKER, a citizen of the United States, and residing at Chicago, Cook county, Illinois, have invented certain new and useful Improvements in Automobile-Wheels, of which the following is a specification.

My invention relates to improvements in automobile wheels and demountable tire-carrying rims therefor. The primary object of my invention is to simplify the construction and operation of such wheels and rims and to lessen the cost thereof. A further object of my invention is to provide a construction by which the demountable rim shall be adapted to be buttoned on to the wheel in the usual manner and still be firmly supported and secured thereon with a minimum of parts. Another object of the invention is to greatly lessen the weight of demountable rim constructions.

The general nature of my invention and also the details of the best embodiment thereof which I have thus far devised will be readily understood on reference to the drawings that form part of this specification, and in which: Figure 1 is a side elevation of a motor vehicle wheel fully equipped in accordance with my invention;—Fig. 2 is a full sized cross section on the line 2—2 of Fig. 1;—Fig. 3 is a similar section on the line 3—3 of Fig. 1;—Fig. 4 is a side view of the portions of the rim and wheel and a clamp thereon;—Fig. 5 is a cross sectional view illustrating a slightly modified form of the invention;—Fig. 6 illustrates another modification of the fixed rim or felly band;—Fig. 7 depicts a portion of the inner periphery of the demountable rim shown in Fig. 2;—and, Fig. 8 is a similar view showing a modificatiton of the bearings or projections on the inner periphery of the demountable rim.

In the drawings, T represents the pneumatic tire and $t'$ is the valve stem thereof. The tire is mounted in or upon the demountable rim, 2. This rim is preferably of uniform thickness and is usually made of cold rolled stock. It is provided with integral tire-holding flanges, $2^a$, which flanges partake of the form of the tire to be carried, *i. e.*, a clencher tire demands a rim of the clencher type, as shown in Figs. 2 and 3; whereas a straight side tire requires a rim of straight side type, as illustrated in Figs. 5 and 6. A rim of the clencher type may be endless; whereas a rim of the straight side type requires either that one flange shall be detachable or that the rim shall be transplit. These rims are distinguished by a substantially cylindrical rim seat, $2^b$, and a substantially cylindrical inner periphery, $2^c$.

The demountable rim is provided with a plurality of integral abruptly shouldered projections, 3, upon its inner periphery. These projections are located adjacent the outer flanges of the rim beneath the portion which is occupied by the outer bead or base portion of the tire. I form these projections from the body of the rim by shearing the latter upon short lines, 4, which parallel the outer flange, and by punching down or depressing the portions, 5. The resulting form of the projection is clearly shown at 3 in Fig. 7. As shown, these projections are circumferentially spaced upon the inner periphery of the rim and each thereof presents an underside or surface, 6, which is gently inclined at an acute angle to the inner periphery, $2^c$, of the demountable rim. The resulting abrupt shoulders, 7, of the projections, obviously, are in circumferential alinement.

Referring now to the construction of the wheel: The wheel is made up of the hub, 8, the spokes, 9, the felly, 10, and the felly-band or fixed rim, 11. As shown, the felly is of much less width than the demountable rim, 2, and the latter is positioned midway on the felly, *i. e.*, with its middle plane coinciding with the middle plane of the wheel.

The fixed rim is mainly cylindrical in form and is of substantially the same width as the felly, 10. The outer circumference of the fixed rim is slightly less than the inner circumference of the demountable rim, only a small annular space, 12, remaining between the two rims when they are put together.

To accommodate the demountable rim upon the wheel, I swage in the outer edge portion, $11^a$, of the fixed rim and thus provide it with a conical bearing surface, $11^b$. This surface comprises a frustum of a cone, which fits the inclined inner faces of the several projections, 3.

The space 12, between the rims is left in order that the rim may be buttoned on to the wheel in the usual manner. In placing the rim on the wheel, the valve stem is first inserted in the valve stem hole (see dotted lines) in the felly band, and felly and the rim is then swung into place on the wheel, i. e., is both swung and pushed axially on to the wheel, until its bearing projections, 3, uniformly engage the conical or beveled surface on the forward edge of the wheel periphery or fixed rim. Thus lodged on the wheel the demountable rim is effectually centered thereon and stably attached thereto.

To secure the rim in this position, I prefer to employ a number of cross bolts, 13, having heads, 14, which bear against the back edge of the fixed rim, 11. The threaded ends of these bolts extend through the front side of the felly and carry the washers or pressure lugs, 15, and the operating nuts, 16. The small plates, 17, on the felly protect the latter from the washers, 15.

When the rim is lodged, as described, the washers and nuts are placed on the bolts and screwed home. As shown, the upper inclined faces, $15^a$, of the washers engage certain of the projections, 3, and force the demountable rim firmly upon its conical seat, $11^b$, on the fixed rim. In practice I prefer that there shall be either five or six of the cross bolts, 13, and in practice I employ twice as many projections, 3, as there are bolts. Hence, as exemplified in Fig. 1, the pressure lugs or washers bear against alternate projections, 3. The intermediate projections, 3, co-act sufficiently to insure the firm seating of the demountable rim on the fixed rim.

It should be understood that a driving connection is provided between the demountable rim and the fixed rim. In the present instance this driving connection comprises a rivet or stud, 18, fastened in the demountable rim, and engaged in a hole, 19, in the fixed rim, as shown in Fig. 3.

As represented in Fig. 5, the general cylindrical form of the fixed rim, $11^x$, may quite as well be preserved by embossing an annular conical portion, $11^y$, on the outer edge thereof, to provide the essential conical rim seat. When desired, the same result may be secured by the use of a hot-rolled section, as shown at $11^z$, in Fig. 6. As also indicated in Fig. 6, the washers or clamping lugs may be formed to follow the rim supporting or seating projections, $3^x$, across the rim seat on the fixed rim.

I desire that it shall be understood that the projections, 3, shown in Fig. 2 are preferred; but, on the other hand, I wish it to be understood that my invention comprehends the employment of projections, $3^y$, of any other shape, which conveniently may be pressed from the body of the rim. However, these projections, $3^y$, should only be used at the intermediate points for at the clamping bolts the abrupt shoulders are to be used. My invention also comprehends the use of rim clamping lugs that engage the outer flange of the rim as distinguished from the bearing projections, 3.

Having thus described my invention, I claim as new and desire to secure by Letters Patent:—

A demountable rim construction comprising a felly band having a frustum of a cone on its outer peripheral edge and forming a rim seat, in combination with a demountable rim, having a plurality of circumferentially spaced complementary inclined projections formed integrally from and upon its inner periphery near its outer flange and coacting with said frustum or seat, and clamping means positioned to coact with certain of said projections.

In testimony whereof I have hereunto set my hand this 9th day of August, 1916.

ERLE KING BAKER.